US005831361A

United States Patent [19]

Yamamoto

[11] Patent Number: 5,831,361

[45] Date of Patent: Nov. 3, 1998

[54] STRUCTURE FOR MOUNTING VIBRATION MOTOR AND BUTTON PEDESTAL

[75] Inventor: Satoru Yamamoto, Shizuoka, Japan

[73] Assignee: NEC Corporation, Tokyo, Japan

[21] Appl. No.: 889,161

[22] Filed: Jul. 7, 1997

[30] Foreign Application Priority Data

Jul. 5, 1996 [JP] Japan .................................... 8-176323

[51] Int. Cl.$^{6}$ .............................. H01H 13/70; H04B 1/38

[52] U.S. Cl. .............................. 310/89; 310/91; 361/807; 361/809; 361/825; 455/347; 248/675

[58] Field of Search ............................... 310/91, 89, 348; 361/807, 808, 809, 810, 825; 455/90, 347; 340/407.1, 311.1, 825.46; 248/615, 622, 674, 675, 677

[56] References Cited

U.S. PATENT DOCUMENTS

| | | | |
|---|---|---|---|
| 4,314,220 | 2/1982 | Ito et al. | 336/65 |
| 4,433,259 | 2/1984 | Okamura | 310/89 |
| 4,865,290 | 9/1989 | Weeks | 248/674 |
| 5,126,607 | 6/1992 | Merriman | 310/51 |
| 5,170,323 | 12/1992 | Perretta et al. | 361/386 |
| 5,272,597 | 12/1993 | Staples et al. | 361/816 |
| 5,546,069 | 8/1996 | Holden et al. | 340/407.1 |
| 5,619,181 | 4/1997 | Murray | 340/407.1 |

FOREIGN PATENT DOCUMENTS

| | | |
|---|---|---|
| 6-181445 | 6/1994 | Japan . |
| 7-302527 | 11/1995 | Japan . |

*Primary Examiner*—Nestro R. Ramirez
*Assistant Examiner*—B. Mullins
*Attorney, Agent, or Firm*—Sughrue, Mion, Zinn, Macpeak & Seas, PLLC

[57] ABSTRACT

A structure for mounting a VIB motor and a button pedestal in a compact portable electronic equipment wherein a rear panel has a plurality of fitting pawls formed by partly bending the rear panel, and a button pedestal has recessed portions to fit with some fitting pawls of a plurality of fitting pawls, and wherein some fitting pawls so fit as to engage with the recessed portions formed in the button pedestal to mount the button pedestal, and the VIB motor is positioned and fixed between all or some other fitting pawls, of some fitting pawls that fix the button pedestal, of the plurality of fitting pawls formed on the rear panel, and fitting pawls, other than some fitting pawls that fix the button pedestal, of the plurality of fitting pawls, thereby mounting the VIB motor.

12 Claims, 4 Drawing Sheets

STRUCTURE FOR MOUNTING VIBRATION MOTOR AND BUTTON PEDESTAL

BACKGROUND OF THE INVENTION

1. Field of the Invention

The present invention relates to a structure for mounting a vibration motor and a button pedestal in a compact portable electronic equipment incorporating the vibration motor which vibrates upon reception of a radio signal to inform signal reception and, more particularly, to a structure for mounting a vibration motor and a button pedestal in a very low-profile compact portable electronic equipment, e.g., a card type electronic equipment.

2. Description of the Prior Art

A conventional structure of this type for mounting a vibration motor (VIB motor) and its button pedestal will be described with reference to the accompanying drawings.

FIGS. 1A to 1C are perspective views showing a conventional example in which a key pad holding structure is applied to a portable radio communication unit, which is identical to the structure shown in FIGS. 1 and 2 of Japanese Unexamined Patent Publication No. 7-302527. This structure aims at providing a holder for holding a key pad. FIG. 1A shows an example in which the key pad holding structure is applied to a portable radio communication unit, FIG. 1B is a perspective view of the lower surface side of the main body case of the key pad holding structure, and FIG. 1C is a perspective view of the lower surface side of the holder. This key pad holding structure has a holder 11, fitting holes 12 formed in the holder 11, and fitting pawls 13 formed on the main body case. The fitting pawls 13 formed on the case are caught by the fitting holes 12 in the holder 11 that holds the conventional key pad, thereby holding the key pad.

FIG. 2 is a plan view showing a conventional structure for mounting a vibration unit on a portable electronic equipment, which is identical to the structure shown in FIG. 1 of Japanese Unexamined Patent Publication No. 6-181445. This shows a conventional structure for holding a VIB motor in which the vibration unit is prevented from generating abnormal noise and the mounting/detaching operation of the vibration unit is simplified. This holding structure has a VIB motor 21, a bracket 22, a rail 23, and a case main body 24. The VIB motor 21 is held by the bracket 22, and the rail 23 that can slidably fix the bracket 22 is set on the inner surface of the case main body 24, so that the VIB motor 21 can be mounted and detached.

In the conventional structure for mounting the VIB motor and the button pedestal described in Japanese Unexamined Patent Publication No. 7-302527 described above, when the case is made of a resin material or the like, the shape of the fitting pawls and the positions of the fitting pawls can be determined comparatively easily, and a space for mounting the board can be ensured. In a very low-profile compact portable electronic equipment, e.g., a card type electronic equipment, a panel serving as an antenna is formed as a housing in order to maintain this low profile. The shape of the fitting pawls cannot thus be easily determined unlike in an example in which the case is made of a resin material or the like. Since a space for mounting the holder is limited, it is important to provide a maximum number of functions with the minimum space, including the space where the holder is to be installed. A vibrator such as a VIB motor is mounted in the holder. If small play is present between the holder made of a resin material and the fitting pawls of the case similarly made of a resin material, when the VIB motor operates, abnormal noise sometimes occurs. Therefore, an implementation for absorbing the noise is required.

In the conventional structure for holding the VIB motor shown in Japanese Unexamined Patent Publication No. 6-181445, the rail must be formed on the case, in addition to the bracket, and the shape of the structure becomes complicated accordingly. In a very low-profile compact portable electronic equipment, e.g., a card type electronic equipment, the mounting space is limited, and such a complicated structure is not suited.

SUMMARY OF THE INVENTION

The present invention has been made in view of the above situation of the prior art, and has as its object to provide a mounting structure with which a button pedestal and a VIB motor can be mounted easily by effectively using a limited mounting space.

It is another object of the present invention to provide a structure for mounting a VIB motor and a button pedestal, which has a function of preventing the VIB motor from generating abnormal noise.

In order to achieve the above objects, according to the present invention, there is provided, in a compact portable electronic equipment comprising a rear panel, a printed board attached to the rear panel, a front button unit connected to the printed board through a flexible member, a button pedestal for fixing and supporting the front button unit, and a VIB motor arranged near the front button unit, a structure for mounting the VIB motor and the button pedestal. The rear panel has a plurality of fitting pawls formed by partly bending the rear panel, and the button pedestal has recessed portions to fit with some fitting pawls of the plurality of fitting pawls, and these fitting pawls fit so as to engage with the recessed portions formed in the button pedestal to mount the button pedestal. The VIB motor is positioned and fixed between all or some of the fitting pawls, of the above fitting pawls that fix the button pedestal, and fitting pawls, other than the above some fitting pawls that fix the button pedestal, thereby mounting the VIB motor.

In the structure for mounting a VIB motor and a button pedestal according to the present invention, in order to effectively utilize the limited mounting space, positioning and fixing of the VIB motor and fixing of the button pedestal are performed by the fitting pawls made of bent portions of the rear panel. In order to prevent abnormal noise from occurring between the button pedestal and the printed board or the like, the tension of the flexible member which is generated because the front button unit is fixed and held on the button pedestal through the flexible member is utilized.

In the structure for mounting a VIB motor and a button pedestal described above, the fitting pawls formed by bending the rear panel are imparted with two functions, i.e., a function of fixing the pedestal of the front button unit and a function of positioning and fixing the VIB motor. The button pedestal can be attached by a single operation with the elastic fitting pawls, and the VIB motor on which a double face member is wound can be pressed into the fitting pawl portion to be positioned and fixed there. Accordingly, the limited mounting space, particularly as in a card type compact portable electronic equipment, is effectively used, so that the button pedestal and the VIB motor can be attached more easily.

The tension of a flexible member, which is used for connecting a button unit indispensable in a compact portable electronic equipment to a printed board, is utilized. Therefore, when the mounting space is small, particularly as in a card type compact portable electronic equipment, abnormal noise can be prevented from being generated by internal vibrators, e.g., the VIB motor and the alarm phone, without adding an extra component.

The above and many other objects, features and advantages of the present invention will become manifest to those skilled in the art upon making reference to the following detailed description and accompanying drawings in which preferred embodiments incorporating the principles of the present invention are shown by way of illustrative example.

BRIEF DESCRIPTION OF THE DRAWINGS

FIGS. 1A to 1C are perspective views showing a conventional example, in which FIG. 1A is a perspective view showing an example in which a conventional key pad holding structure is applied to a portable radio communication unit, FIG. 1B is a perspective view showing the lower surface side of the main body case of the key pad holding structure, and FIG. 1C is a perspective view showing the lower surface side of the holder;

FIGS. 5A to 5C concern the detailed shapes of the constituent elements of the embodiment of the present invention shown in FIGS. 3 and 4, in which FIGS. 5A and 5B are enlarged longitudinal sectional views of a fitting pawl portion formed on the rear panel, and FIG. 5C is a view of the rear panel seen from the direction of an arrow A of FIG. 3.

DETAILED DESCRIPTION OF PREFERRED EMBODIMENT

A structure for mounting a VIB motor and a button pedestal according to a preferred embodiment of the present invention will be described in detail with reference to the accompanying drawings.

Figure 1A:
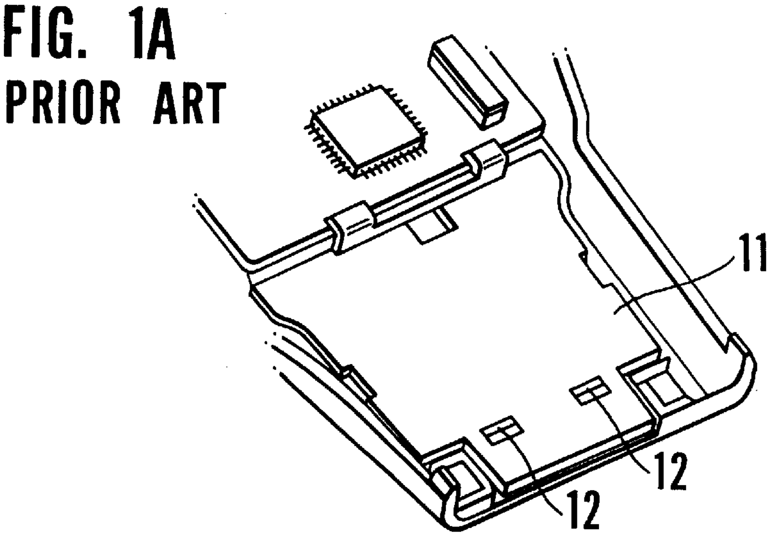
FIG. 1A PRIOR ART
Figure 1B:
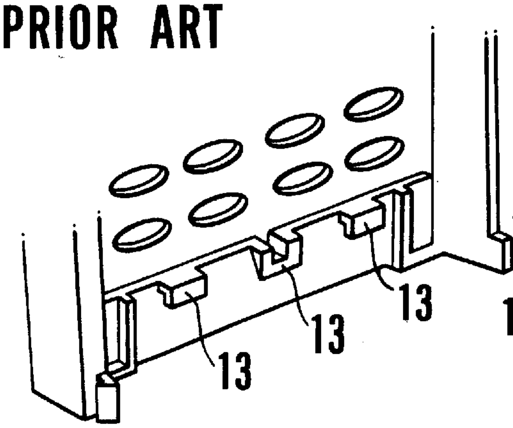
FIG. 1B PRIOR ART
Figure 1C:
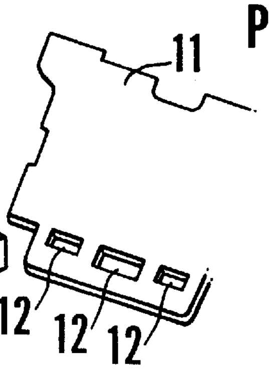
FIG. 1C PRIOR ART
Figure 2:
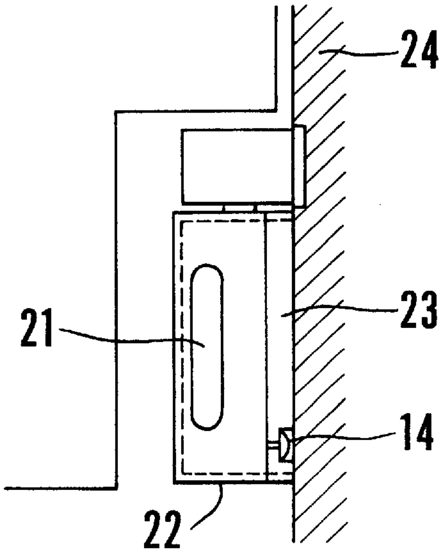
FIG. 2 PRIOR ART
FIG. 2 is a plan view showing a conventional mounting structure for a vibration unit in a compact electronic equipment.
Figure 3:
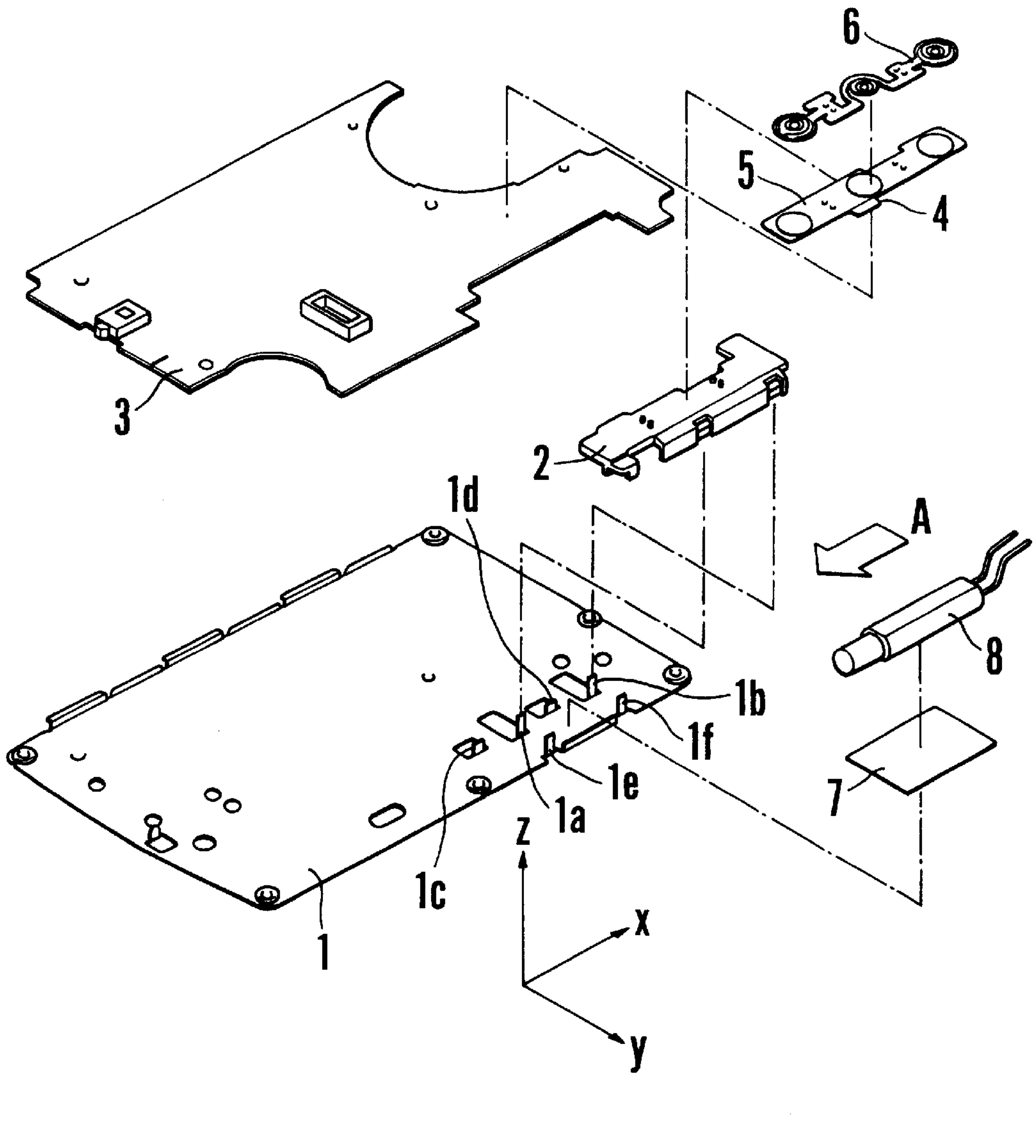
FIG. 3 is an exploded perspective view showing the constituent elements of a structure for mounting a VIB motor and a button pedestal according to an embodiment of the present invention.

FIG. 3 is an exploded perspective view showing an embodiment of the present invention. The structure for mounting the VIB motor and the button pedestal according to the present invention comprises a rear panel 1, a total of 6 fitting pawls 1*a* to 1*f*, a printed board 3, a front button unit 5, a pedestal 2 of the front button unit 5, a leaf spring 6, and a VIB motor 8. The fitting pawls 1*a* to 1*f* are formed by partly bending the rear panel 1. Small chip components (not shown) are mounted on the printed board 3. The front button unit 5 is electrically connected to the printed board 3 through a flexible member 4. The pedestal 2 is fixed and positioned by the fitting pawls 1*a* to 1*f* of the rear panel 1. The leaf spring 6 aims at obtaining the click touch of the front button unit 5. The VIB motor 8 is positioned by the fitting pawls la to if of the rear panel 1 and fixed through a double face member 7. The fitting pawls 1*a* and 1*b*, 1*c* and 1*d*, and 1*e* and 1*f* of the rear panel 1 are of the shame shape and the same height. The respective fitting pawls 1*a* and 1*f* are formed at different positions. The fitting pawls 1*e* and 1*f* are formed at the edge portion of the rear panel 1, while the fitting pawls 1*a*, 1*b*, 1*c*, and 1*d* are formed at positions slightly inside the edge portion of the rear panel 1. The rear panel 1 and the printed board 3 are positioned at high precision by a predetermined mounting jig and integrated by joining, e.g., soldering. The front button unit 5 is soldered to the printed board 3 through the flexible member 4. The pedestal 2 of the front button unit 5 is pressed into the portion where the fitting pawls 1*a*, 1*b*, 1*c*, and 1*d* are formed at slightly inside the edge portion of the rear panel 1, and is positioned and held there.

In this embodiment, the number of fitting pawls 1*a* to 1*f* is 6, the number of some fitting pawls (first group) 1*a* to 1*d* is 4, the number of all or some other fitting pawls (second group) 1*a* and 1*b*, of the some fitting pawls 1*a* to 1*d* is 2, and the number of fitting pawls (third group) 1*e* and 1*f*, other than the above some fitting pawls that fix the button pedestal 2, is 2. All or some other fitting pawls 1*a* and 1*b*, of the above some fitting pawls 1*a* to 1*d* have the same shape and are different only in their positions. The fitting pawls 1*e* and 1*f*, other than all or some other fitting pawls, of the above some fitting pawls 1*a* to 1*d* have the same shape and are different only in their positions. Of the plurality of fitting pawls 1*a* to 1*f*, the fitting pawls 1*e* and 1*f*, other than the above some fitting pawls that fix the button pedestal, have the same shape and are different only in their positions.

The first group of fitting pawls 1*a*, 1*b*, and 1*c*, 1*d*, are formed alternately and substantially along the same line. The third group of fitting pawls 1*e*, 1*f*, are formed at the edge portion of the rear panel 1.

Regarding the material, the plurality of fitting pawls 1*a* to 1*f* formed on the rear panel 1 are preferably made of an elastic material, and the button pedestal 2 is preferably made of a resin material.

Figure 4:
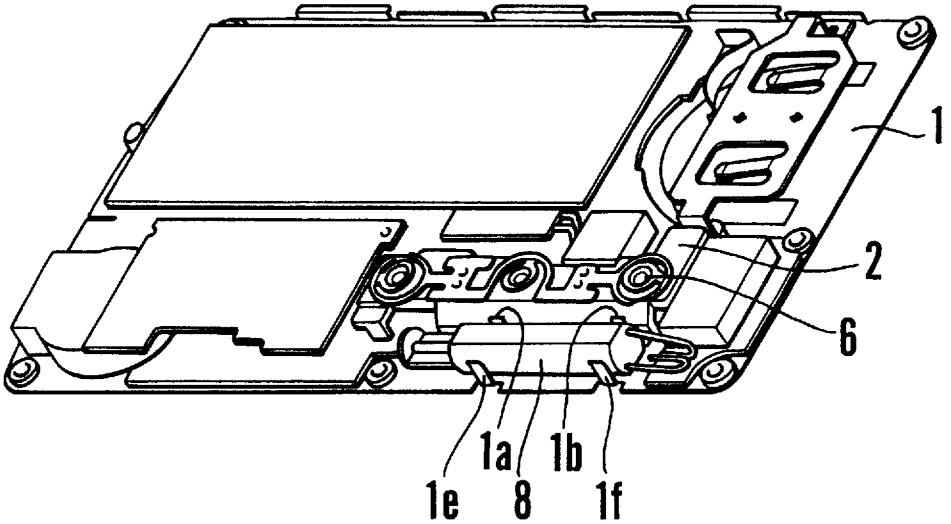
FIG. 4 is an outer perspective view showing the embodiment of the present invention shown in FIG. 3 in an assembled state.

FIG. 4 is an outer perspective view of the structure for mounting the VIB motor and the button pedestal of the present invention in an assembled state. The VIB motor 8 is fixed by the fitting pawls 1*e* and 1*f* at the edge portion of the rear panel 1, and the leaf spring 6 can be seen behind the VIB motor 8. The pedestal 2 is fixed under the leaf spring 6.

Figure 5A:
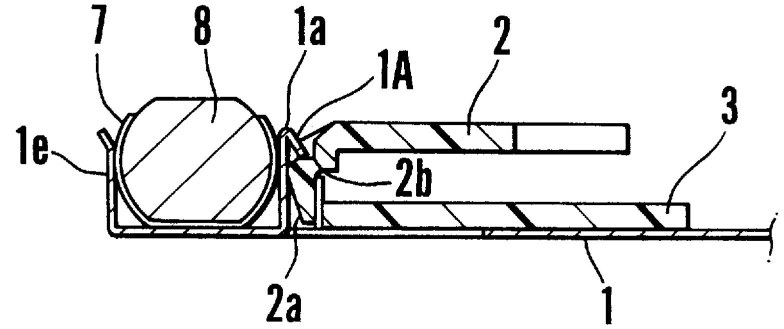
Figure 5B:
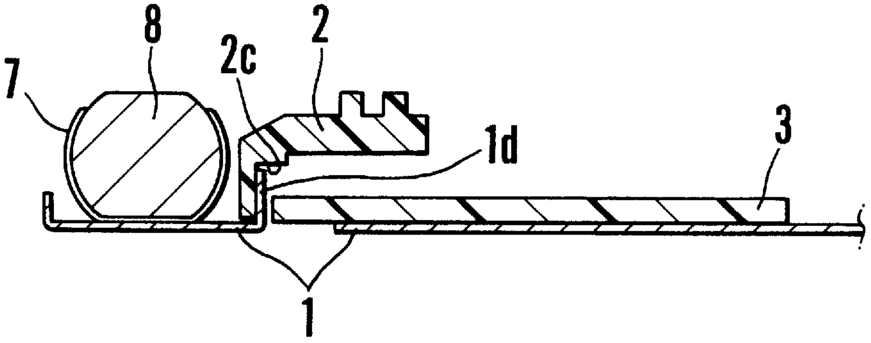
Figure 5C:
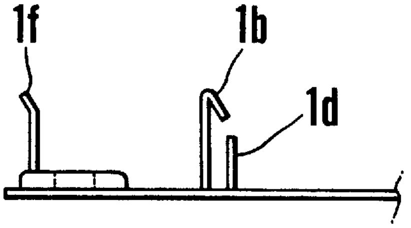

FIGS. 5A to 5C are sectional views respectively showing in detail the shape of the constituent elements, in particular the fitting pawl portion, of the structure for mounting the VIB motor and the button pedestal according to the present invention.

FIG. 5A is a sectional view of the fitting pawl 1*a* portion of the rear panel 1. The pedestal 2 has, at its portion fitting with the fitting pawl 1*a*, a taper portion 2*a* for facilitating the pressing operation, and a recessed portion 2*b* formed immediately above the taper portion 2*a*. A bent portion 1A is formed at a portion of the fitting pawl 1*a* that fits with the pedestal 2 by partly bending the fitting pawl 1*a* at an acute angle. When fitting the pedestal 2 on the fitting pawl 1*a*, the pedestal 2 is pressed into the fitting pawl 1*a*. Thereafter, the recessed portion 2*b* formed in the pedestal 2 is pressed with the bent portion 1A at the distal end of the fitting pawl 1*a*. Thus, the pedestal 2 can be firmly held in the Z direction of FIG. 3. The fitting pawl 1*b* fits with the pedestal 2 in the same manner.

FIG. 5B is a sectional view of the fitting pawl 1*b* of the rear panel 1. Since the fitting pawl 1*d* fits in a recessed portion 2*c* formed in the pedestal 2, the pedestal 2 can be positioned in the X direction of FIG. 3. The fitting pawl 1*c* portion fits with the pedestal 2 in the same manner.

FIG. 5C is a view of the rear panel 1 seen from the direction of an arrow A of FIG. 3. The gap between the fitting pawls 1*b* and 1*d* of the rear panel 1 is set as shown in FIG. 5C, and the pedestal 2 is pressed onto the rear panel 1 to fit in this gap. Thus, the fitting pawls 1*b* and 1*d* can position the pedestal 2 in the Y direction of FIG. 3 together with the fitting pawls 1*a* and 1*c*. In this manner, the pedestal 2 can be positioned in all the X, Y, and Z directions only by fitting it with the fitting pawls 1*a* to 1*f* of the rear panel 1 with pressure.

A minimum number of legs for stabilizing the pedestal 2 of the front button unit 5 are formed at portions on the printed board 3 where components are not present (not shown particularly). When the front button unit 5 is attached to the pedestal 2 of the front button unit 5 through a double face member or the like, the flexible member 4 of the front button unit 5 is bent semicircularly, so that a tension acts on the flexible member 4. When the front button unit 5 is incorporated in the case (not shown), a tension acts on the whole portion integrated with the pedestal 2 together with the leaf spring 6 attached on the front button unit 5 through a double face member or the like. Therefore, a buzz or abnormal noise can be suppressed from being generated by the vibrator, e.g., the VIB motor or an alarm phone.

As shown in FIG. 5A, since the VIB motor is held and positioned among the fitting pawls 1*a*, 1*b*, 1*c*, and 1*f* of the rear panel 1 by using different double face members, the fitting pawls 1*a* and 1*b* of the rear panel 1 are commonly used by the fixing portion of the pedestal 2, as described above. The space can be effectively used accordingly.

The embodiment of the present invention exemplifies a structure for mounting the VIB motor and the button pedestal. However, the present invention can be applied to a structure for mounting only one of the VIB motor and the button pedestal. The number and positions of the fitting pawls 1*a* to 1*f* of the rear panel 1 may be changed, and the shape of the button pedestal 2 may be changed accordingly, as a matter of course. If the mounting space is not particularly small, unlike in a card type compact portable electronic equipment, the present invention is effective, as a matter of course.

What we claim is:

1. A compact portable electronic equipment comprising a rear panel, a printed board attached to said rear panel, a front button unit connected to said printed board through a flexible member, a button pedestal for fixing and supporting said front button unit, and a VIB motor arranged near said front button unit, a structure for mounting said VIB motor and said button pedestal, wherein said rear panel has a plurality of fitting pawls formed by partly bending said rear panel, said plurality of fitting pawls including a first, second and third group of fitting pawls, said first, second and third groups of fitting pawls being nonexclusive of each other, and said button pedestal has recessed portions to fit with said first group of fitting pawls of said plurality of fitting pawls, and said first group of fitting pawls fit so as to engage with said recessed portions formed in said button pedestal to mount said button pedestal, and said VIB motor is positioned and fixed between said second group of fitting pawls, and said third group of fitting pawls, thereby mounting said VIB motor.

2. A structure according to claim 1, wherein the number of said plurality of fitting pawls is 6.

3. A structure according to claim 1, wherein the number of said first group of fitting pawls is 4.

4. A structure according to claim 1, wherein the number of said second group of fitting pawls is 2.

5. A structure according to claim 1, wherein the number of said third group of fitting pawls is 2.

6. A structure according to claim 4, wherein said second group of fitting pawls have the same shape and are different only in positions thereof.

7. A structure according to claim 3, wherein said third group of fitting pawls have the same shape and are different only in positions thereof.

8. A structure according to claim 5, wherein said second and third groups of fitting pawls of said plurality of fitting pawls, have the same shape and are different only in positions thereof.

9. A structure according to claim 1, wherein said first group of fitting pawls are formed alternately and substantially in one line.

10. A structure according to claim 1, wherein of said plurality of fitting pawls, said third group of fitting pawls are formed at an edge portion of said rear panel.

11. A structure according to claim 1, wherein said plurality of fitting pawls formed on said rear panel have elasticity.

12. A structure according to claim 1, wherein said button pedestal is made of a resin material.

* * * * *